United States Patent [19]

Obstfelder

[11] Patent Number: 4,626,044

[45] Date of Patent: Dec. 2, 1986

[54] HYDRAULIC BRAKE FOR VEHICLES

[75] Inventor: Günther Obstfelder, Weinheim-Lützelsachsen, Fed. Rep. of Germany

[73] Assignee: Hauni-Werke Körber & Co. KG., Hamburg, Fed. Rep. of Germany

[21] Appl. No.: 639,817

[22] Filed: Aug. 13, 1984

[30] Foreign Application Priority Data

Aug. 29, 1983 [DE] Fed. Rep. of Germany ....... 3331064

[51] Int. Cl.⁴ .............................................. B60T 8/087
[52] U.S. Cl. ..................................... 303/116; 188/292
[58] Field of Search ............... 188/181 A, 181 C, 292, 188/293, 294; 303/10, 11, 116

[56] References Cited

U.S. PATENT DOCUMENTS

| | | | |
|---|---|---|---|
| 1,207,801 | 12/1916 | Schmidt | 303/116 X |
| 1,710,032 | 4/1929 | Price | 188/292 |
| 1,779,639 | 10/1930 | Price | 188/292 X |
| 2,071,405 | 2/1937 | Jahnel | 188/292 X |
| 3,288,538 | 11/1966 | Marcellus | 303/116 X |

Primary Examiner—Duane A. Reger
Attorney, Agent, or Firm—Peter K. Kontler

[57] ABSTRACT

A hydraulic brake having an electrohydraulic antiskid system with a high switching frequency which is speed-proportional. The switching frequency is determined from the number of cross holes in a gear and the gear speed. The cut-in time is electronically determined in a computer and control circuit by a speed comparison of all wheels, whereby the switching frequencies of the passing teeth of a transport gear to a sensor are used as control impulses. If the computer and control circuit determines a deviation, e.g., if a wheel is being braked too sharply and, therefore, runs slower than the other wheels, a camshaft is rotated only in a forward direction, thus activating an antiskid system. If the difference is zero, the camshaft falls back into its initial position, the antiskid system is cut-out and only the braking system of the piston is operating.

15 Claims, 9 Drawing Figures

HYDRAULIC BRAKE FOR VEHICLES

BACKGROUND OF THE INVENTION

This invention relates to a hydraulic brake for vehicles. The invention particularly relates to a hydraulic differential brake for vehicles with an antiskid system.

West German Reference No. 32 12 359 teaches a hydraulic brake device for vehicles which comprises a hydraulic system consisting of a pump with a reservoir for the hydraulic fluid and a non-return valve for the braking. The mechanical or kinetic energy produced by the engine is converted into thermal energy in the hydraulic fluid.

However, this system is for installation in a new vehicle and is unsuitable as a replacement for conventional brakes. A control of the braking force in accordance with the necessary conditions is not possible.

The main disadvantages of conventional brakes reside in the fact that the brake wears and that is damaging to the environment. Practically all brake linings contain asbestos fibers which are rubbed off during the braking procedure and released into the environment. For this reason the wear of current vehicle brakes contributes heavily to the contamination of the environment with very fine asbestos particles and with heavy metals originating from the discs and drums of the brakes. Moreover, the expense occasioned over the service life of a vehicle by brake wear is considerable.

An antiskid system is also known which is intended to electronically prevent the wheels from skidding during braking, whereby the brake shoes are loosened again somewhat during the braking procedure shortly before the wheel stops in order to keep the wheel turning against the forces of friction. The known antiskid system has a set closing and opening frequency of approximately 10 Hz, which is noticeable in the form of an unpleasant chattering. In addition, this antiskid system requires a considerable expenditure of the electronic and electro-magnetic-hydraulic components, thus making it expensive and, for this reason, suitable for only a small number of vehicles. Aside from the above, this system is very susceptible to failure due to its complexity.

SUMMARY OF THE INVENTION

This invention has the task of creating a completely new hydraulic brake which exhibits practically no wear, emits no worn material into the atmosphere and, in particular, also has a hydraulic antiskid system. In addition, the existing hydraulic system of the vehicle can be used as a brake line for braking.

The hydraulic brake in accordance with the invention has the great advantage that it exhibits practically no wear and in particular emits no worn particles into the atmosphere. The brake of the invention is a completely closed system which is not damaging to the environment. Since this brake is subject to practically no wear, its service life is enormously longer than that of current brake parts which are subject to wear. Aggregates, such as brake aids, braking force amplifiers, drums or discs and the associated brake shoes can be eliminated, which constitutes a very advantageous advance. Moreover, the existing hydraulic system, consisting of a brake master cylinder and its control line, can be used in order to control the slide or the piston of the brake of the invention. Since the slide or the piston only has to be shifted against a low pressure, the necessary hydraulic cylinders and feed lines can be smaller and therefore cheaper. The use of the brake of the invention thus eliminates a series of aggregates which are currently necessary.

The heat dissipation of the thermal energy produced in the hydraulic brake fluid during the braking process occurs in an advantageous manner by the release of thermal energy to the housing and subsequently to the atmosphere. A water cooling for the housing can also be provided with advantages, whereby the housing is located in a cooling circuit. The thermal energy in the hydraulic fluid is thus transmitted to the housing and from it to the cooling medium of the cooling circuit, from which the heat is transmitted to the atmosphere.

The special advantage of the hydraulic brake of the invention resides in its construction as a differential brake with an antiskid system. In this construction the brake can be used during the acceleration of the vehicle as a "soft" locking differential, whereby the term "soft" means that a slight slip is permissible between the wheels for better adaptation.

Such a differential brake in accordance with the invention has an electrohydraulic antiskid system with a high switching frequency which is speed-proportional. The switching frequency is determined from the number of cross holes in the gear and by its particular speed. Thus, the switching frequency is several times greater than the switching frequency of the known antiskid system, which is, in addition thereto, permanent. All valves, valve controls and accessories required today can be eliminated, which constitutes a great advantage. Moreover, the generation of frequency occurs without inertia. The cut-in time is electronically determined in a computer and control circuit by a speed comparison of all wheels among themselves, whereby the switching frequencies of the passing teeth of a transport gear to a sensor are used with advantages as control impulses to this end. This achieves a high resolution for the subtraction. If the computer and control circuit determines a deviation, e.g., if a wheel is braked too sharply during the braking procedure and therefore runs slower than the others, the camshaft is rotated only in a forward direction, thus forcing the antiskid system to develop its action. If the difference is zero, the camshaft falls back into its initial position, the antiskid system is obligatorily cut out and only the braking system of the piston keeps working.

In order to prevent the wheels from skidding during a full braking, the particular speed is determined and fed to the microprocessor of the control circuit which thus knows from what speed a full braking is initiated. Then, the braking of each wheel only by the piston to a set lower frequency is admitted via a software program. When this lower frequency is reached, the brake is briefly opened by the antiskid system and the vehicle speed reached is again the initial speed for the next braking cycle. In this manner the antiskid system of the invention can allow lower wheel speeds before skidding than the current state-of-the-art antiskid systems. Moreover, as the speed decreases during the braking procedure, especially during a full braking, this limiting value at which the brake must be briefly opened by the antiskid system can be lowered by software in each cycle, starting from the vehicle speed just achieved. For this reason the antiskid system of the invention can regulate down the skid threshold in accordance with the instantaneous speed of the vehicle and the impulse frequency of the particular brake to smaller and smaller values.

If the vehicle speed drops below a given value, an intermittent monitoring frequency can be superimposed in an advantageous manner on the frequency of the antiskid system by the camshaft. To this end the camshaft is rotated with a frequency of a few 10 Hz intermittently from the closed position into the open position, which causes the antiskid system to act in a most advantageous manner almost down to zero speed, i.e. nearly to the stop of the vehicle. This creates an antiskid system which is completely effective precisely in critical situations at low speed, e.g., as on smooth ice.

In addition, the brake for the invention is also a locking differential with limited slip and an antiskid system. To this end the camshaft has a double passage, as does the piston. The one passage through the camshaft and piston functions during shifting as a locking differential and is always open in an inoperative position. The other passage functions during shifting as an antiskid system and is always closed in an inoperative position.

Another advantage is the fact that a brake has now been created for the first time with an antiskid system and locking differential in which the differing speeds of two parallel wheels can be compensated.

The invention thus makes available for the first time a hydraulic brake with locking differential, preferably a soft locking differential which is practically wear-free, not harmful to the environment and which, in particular, comprises a hydraulic antiskid system with speed-dependent switching frequency. In addition, the device can be used in a most advantageous manner as a locking differential with limited slip and an antiskid system. In the known antiskid system the acceleration behavior or a vehicle is not taken into consideration. The hydrobrake of the invention will therefore contribute decisively to the improving of the safety and of the behavior during travel of future automobiles. The braking device of the invention, in contrast to the known vehicle brakes, is not pressure-dependent, but rather road-dependent, for which reason alone it can react in a more differentiated manner.

BRIEF DESCRIPTION OF THE DRAWINGS

Examples of the invention are illustrated in the drawings and described below.

DETAILED DESCRIPTION OF THE PREFERRED EMBODIMENTS

The simplest construction of a hydraulic brake in accordance with the invention consists of a gear pump with a closed circulation line. Hydraulic braking fluid is delivered from a reservoir, the vacuum reservoir chamber, via the gear spaces between the teeth of one of the gears into a pressure chamber. The pressure chamber and the vacuum chambers are connected to one another by a pressure return line which contains a valve with a slide. This return line is located inside the axis of rotation of one of the two gears.

During the braking procedure the slide chokes the valve passageway to a greater or lesser extent, correspondingly decreasing the delivery of the flow and braking the gears.

The Figures show a hydraulic differential brake with an antiskid system. This brake can also be operated as a locking differential transmission with an antiskid system. This position is the inoperative position.

Figures 5, 6:
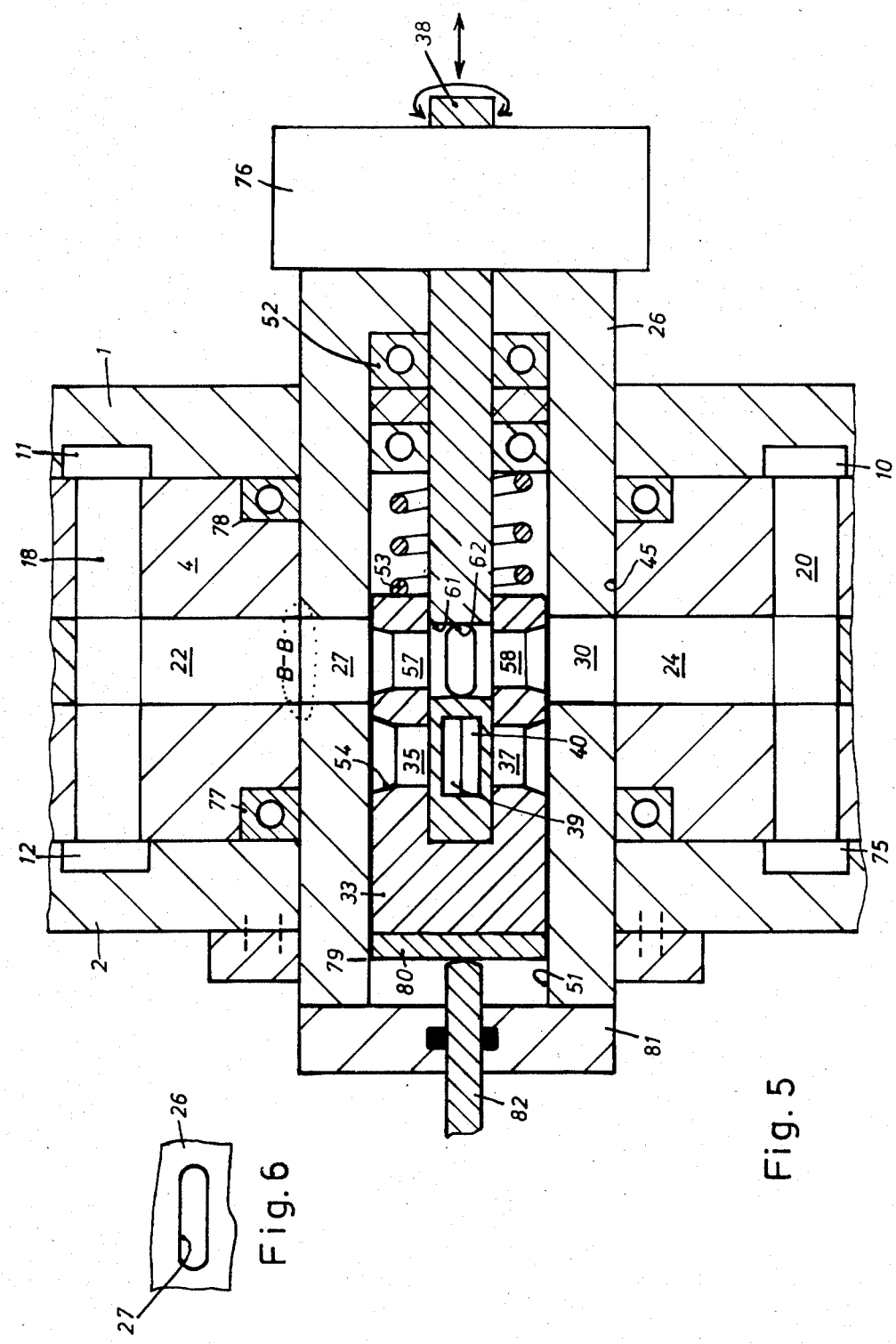
FIG. 5 is a cross-sectional view of the hydraulic differential brake and the differential locking transmission of shown in FIG. 1 showing a flow path in the brake, cylinder, piston, and camshaft.
FIG. 6 is a partial, top view of the cylinder in the B—B area shown in FIG. 5.

The hydrobrake consists of two housing dishes 1, 2 in which two gears 3, 4 are located in a pressure-tight manner as in a gear hydropump. Gear 3 is mounted directly on wheel shaft 5, for example, and gear 4 is mounted so that it can rotate about stationary cylinder 26 which runs through both ends of housing dishes 1, 2 (FIG. 5). Gears 3, 4 mesh with their gear rims 48, 50, whereby pressure chamber 43 is formed below the contact point of the gears and vacuum chamber 44 is formed above their contact point during the counterclockwise rotation of gear 4. The housing has a recess 13 in its upper part into the top of which fill piece 14 extends, which is closed by nut 15. The housing is filled with a brake fluid whose liquid level 16 extends up into piece 14, leaving air cushion 17. This air cushion has the function of compensating pressure, e.g., temperature variations.

A dosing gear 6, 7 is positioned at the top area of each of gears 3, 4, which represent the delivery gears. These dose gears dose the liquid volume delivered by delivery gears 3, 4. These dosing gears 6, 7 are likewise positioned in a pressure-tight manner in the housing.

Figure 2:
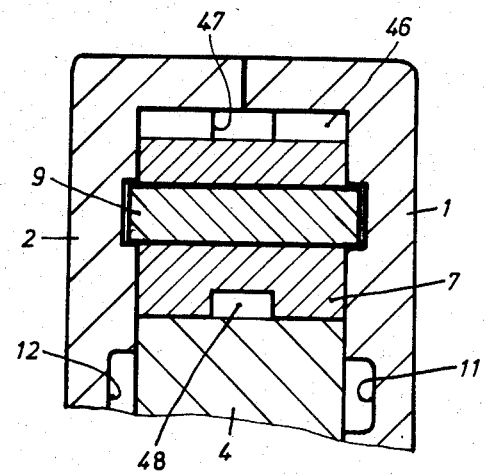
FIG. 2 is a cross-sectional view taken along A—A in FIG. 1.

In FIG. 2 dosing gear 7 is rotatably mounted about shaft 9, which is suitably mounted in housing dishes 1, 2. Gear rim 46 of dosing gear 7 has a peripheral recess 47, e.g., a turned groove which constitutes a through-put window for the brake fluid. When the dosing gear meshes with delivery gear 4, only the quantity corresponding to the section of recess 47 is let through in the inlet area. Only this amount then runs between the tooth flanks of gear rims 46, 48. For this reason the (not cut) tooth flank of the corresponding gear of gear rim 48 of delivery gear 4 can be seen in FIG. 2 in the lower area of recess 47.

Figure 1:
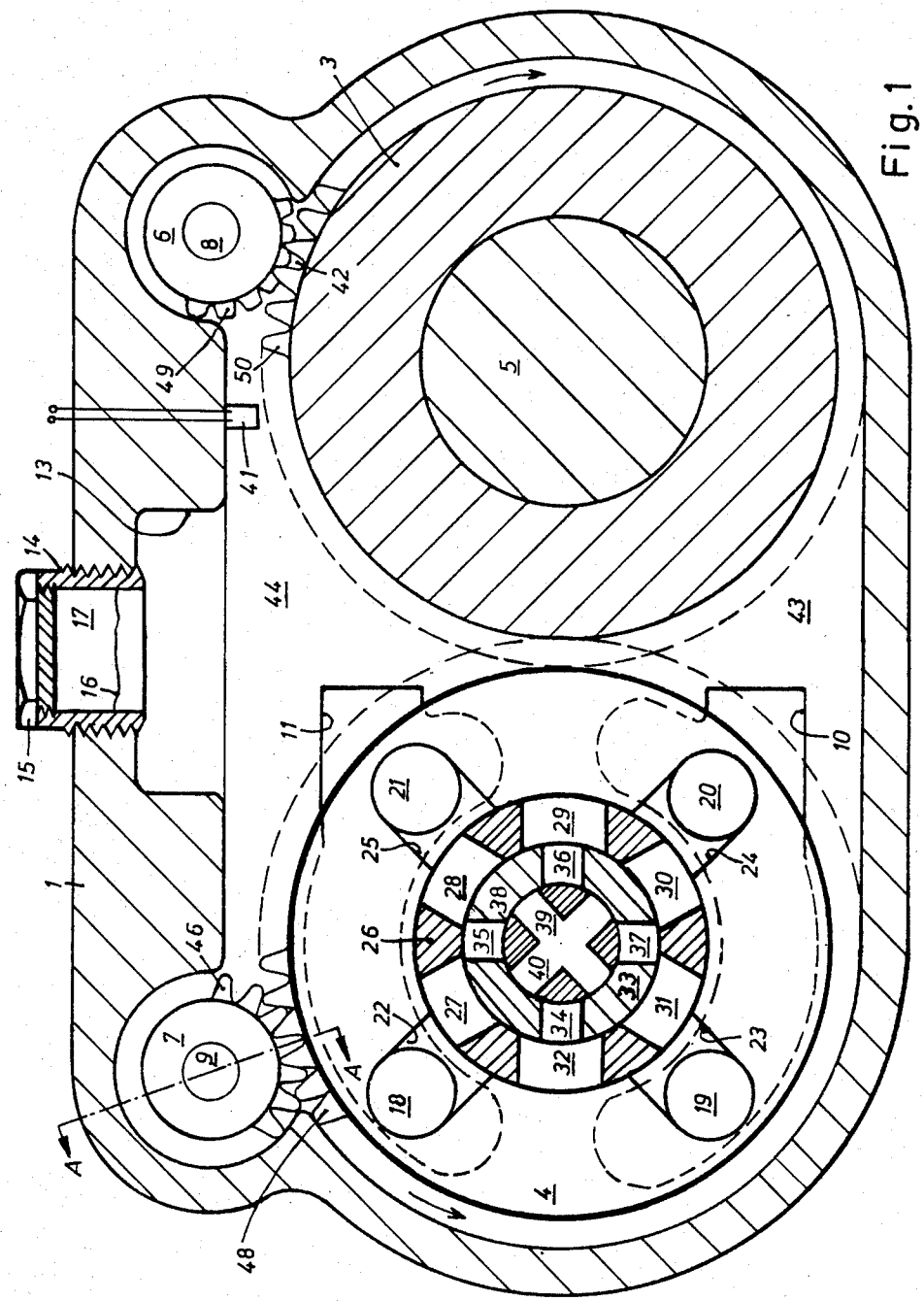
FIG. 1 is a cross-sectional view of a hydraulic differential brake and locking transmission in accordance with the invention in braking position.

FIG. 1 shows another dosing possibility by means of dosing gear 6. This dosing gear 6 is again rotatably mounted about shaft 8 which is suitably mounted in housing dishes 1, 2. The teeth of gear rim 49 of dosing gear 6 have a lower height then the teeth of gear rim 50 of meshing delivery gear 3. During the rolling off of gear rims 49, 50, which is otherwise pressure-tight, an intermediary space 42 which is filled with brake fluid remains between the tooth flanks of the teeth of gear rim 50. In this manner a certain amount of brake fluid is also delivered by driving gear 3 which is used to lubricate gear 3 in housing dishes 1, 2 and for cooling, in particular, to achieve a favorable distribution of the brake fluid in the housing.

In FIGS. 1 and 5 gear 4 has a plurality of equidistantly spaced through holes, e.g., four cross holes 18, 19, 20, 21 in the vicinity of its dedendum line into which radial bores 22, 23, 24, 25 empty. These radial bores were bored in the manufacturing process starting from the addendum line of gear 4 (FIG. 5) and the upper part of each radial bore was closed over the cross hole. This produces the formation of the T-shaped cross holes and of the radial bores mixing with them shown in FIG. 5. These radial bores empty into central bore 45 of gear 4.

Cylinder 26, which is rigidly connected to the housing, extends through housing dishes 1, 2 and through central bore 45 of gear 4. This cylinder 26 also forms the shaft of gear 4, which has ball bearings 77, 78 inside central bore 45 with which gear 4 rotates about cylinder 26. Gear 4 is sealed in a pressure-tight manner against cylinder 26.

Cylinder 26 is a hollow cylinder and has longitudinal control bore 51, which can be a blind bore, for example. Cylinder 26 has a number of holes in the vicinity of radial bores 22 to 25 in gear 4 which is greater than the number of cross and radial bores in gear 4. For example, cylinder 26 has six radial slots 27, 28, 29, 30, 31, 32 which are directed parallel to the longitudinal axis of the cylinder, are located at equidistant intervals in a cross sectional plane and extend to longitudinal bore 51.

The radial holes in the cylinder are preferably slots (FIG. 6), so that when the mouth of a radial bore of gear 4 passes by, the area freed by the mouth of slit 27 increases practically linearly. The number and the cross-sectional area of holes 27 to 32 in cylinder 26 are maintained in such a manner that when gear 4 rotates, a flow-through is assured at each angle of rotation through at least one hole of cylinder 26 through at least one radial bore in gear 4.

Piston 33 is located in longitudinal bore 51 of cylinder 26 which can move against the force of pressure spring 53 located in bore 51 of cylinder 26. Piston 33 has pressure plate 80 on one end and cylinder 26 is closed at the piston and by cylinder cap 81 through which push rod 82 contacts pressure plate 80. This push rod 82 can be moved by known hydraulic or pneumatic devices in order to move piston 33 against the force of spring 53 in bore 51.

Figure 3:
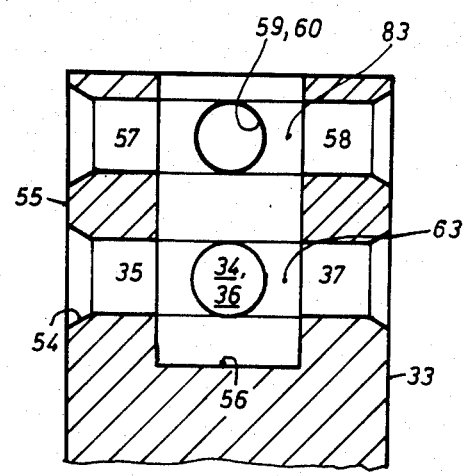
FIG. 3 is a cross-sectional view through the front end of the piston.

In FIG. 3 piston 33 preferably has a central blind bore 56. Through bores located in the same longitudinal planes and over each other at equidistant intervals are positioned radially to this bore 56. These through bores correspond in number to the number of radial bores 22 to 25 of gear 4. For example, the holes here are four bores 34, 35, 36, 37 and 57, 58, 59, 60 symmetrically superimposed over each other. The bores can have depressions 54 emanating from the jacket wall of the piston. There is such an interval between radial bores 34 to 37 and radial bores 57 to 60 that a circular, closed, annular jacket cover area 55 remains. Moreover, the radial bores which empty into blind bore 56 have such a diameter that a blocking area 63, 83 remains between the inner mouths of two adjacent radial bores, e.g., 36, 37 or 58, 59. Since the bores are preferably identical and symmetrical, blocking surfaces 63, 83 are also equally large. Radial bores 34 to 37 including inner associated blocking surfaces 63 aid the braking procedure, while radial bores 57 to 60 including the inner associated blocking surfaces 83 function as flowthrough openings when the system is at rest. At the same time they help the system to be used as a locking differential transmission.

Camshaft 38 penetrates into blind bore 56 of piston 33, extends through the inner area of cylinder 26, is mounted in a pressure-tight manner in sealing housing 52, end pierces the end of cylinder 26 opposite push rod 82. This camshaft 38 is carried along by piston 33 when it moves due to the blind bore and when piston 33 returns to rest position 79, camshaft 38 likewise returns. Step motor 76, into which camshaft 38 extends, is located on the front end of cylinder 26. Camshaft 38 can be rotated by step motor 76. To this end the camshaft is suitably held in step motor 76, e.g. by a wedge socket fitting. In this manner camshaft 38 can be carried along both in translation due to piston 33 and also be turned in rotation due to step motor 76.

Figure 4A:
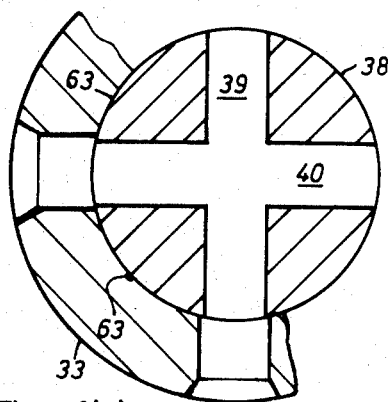
FIGS. 4(a) and 4(b) are cross-sectional views of the passage slots of the camshaft with the same angle of rotation with part of the piston on according of its blocking surfaces.
Figure 4B:
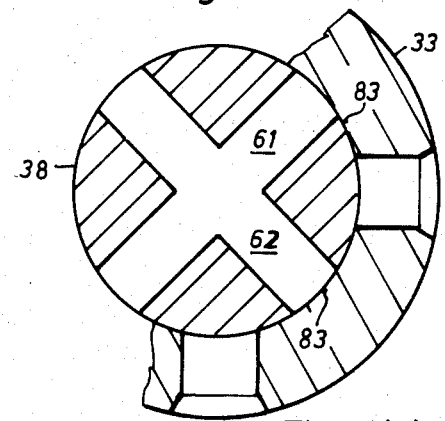

In FIGS. 4 and 5 camshaft 38 comprises through holes which lie in various cross-sectional planes and preferably run radially. The number of radial holes of each of the two cross-sectional planes is identical to the number of radial bores in gear 4. For example, the through holes shown in the first cross-sectional plane in FIG. 4a are radial longitudinal slots 39, 40 which cross each other at a right angle and are associated with the brake system, here radial bores 34 to 37 of piston 33. The through holes of FIG. 4 of the second cross-sectional plane are likewise radial longitudinal slots 61, 62 which cross each other at a right angle and are associated with the locking differential, here radial bores 57 to 60 of piston 33. Both pairs of through slots 39, 40 and 61, 62 are reciprocally rotated by an angle corresponding to the number of through holes, thus, by 45° in the example shown here. The position of camshaft 38 and of piston 33 and cylinder 26 opposite gear 4 shown in FIG. 5 is the rest position of the system. In this instance through slots 61, 62 correspond with radial bores 57 to 60 of piston 33.

Camshaft 38 can be rotated by step motor 76 in such a manner that either of the mouths of through slots 39, 40 correspond with radial bores 57 to 60 of piston 33, which constitutes the rest position of the system; or, on the other hand, if camshaft 38 is rotated through 45 in the example shown here, then blocking areas 83 close through slots 39, 40 and the passage through piston 33 is interrupted.

Through slots 61, 62 are associated with bores 34 to 37 of piston 33 in the same manner. In the rest position shown in FIG. 5 blocking areas 63 close the mouths of through holes 61, 62. If camshaft 38 is rotated by 45°, the mouths of through slots 61, 62 correspond with radial bores 34 to 37. However, the passage just described only becomes active as soon as piston 33 is pushed into braking position, carrying along camshaft 38 with it.

When the brake is not activated, both gears 3, 4 deliver a certain amount of brake fluid to pressure chamber 43. At the same time a return current flows from pressure chamber 43 via grooves 16, 17 in housing cover 1, 2, cross hole 20 and radial bore 24 of gear 4, radial slot 32 of cylinder 26, radial bore 58 of piston 33, through slot 61 of camshaft 38, radial bore 57 of piston 33, radial slot 27 of cylinder 26, radial bore 22 and cross bore 18 of gear 4, and via grooves 11, 12 in housing dishes 1, 2 back to vacuum chamber 44, which closes the circuit of the fluid.

If the braking procedure is initiated, piston 33 is moved by push rod 82 in FIG. 5 from left to right against the force of pressure spring 53. Radial bores 57 to 60 in piston 33 are pushed out of communication with radial slots 27 to 32 of cylinder 26. Annular jacket area 55 begins to uncover slots 27 to 33. As piston 33 moves further, radial bores 34 to 37 of piston 33 finally communicate with slots 27 to 32 of cylinder 26. Since camshaft 38 is rotated in a blocking direction in relation to radial bores 34 to 37 of piston 33, this interrupts the flow of liquid through piston 33, a superpressure develops in pressure chamber 43 which brakes and finally stops rotation of gears 3, 4. This brake position is shown in FIG. 1.

The antiskid system can now be activated during the braking procedure as a result of the rotation of camshaft 38.

A central computer and control circuit (not shown) receives, along with the particular absolute speed of the vehicle via impulse emitter 41 in each brake, an impulse train corresponding to the passing teeth of gear rims 50 of gear 3. The computer and control circuit determines by comparing the impulse frequencies of the individual brakes among each other whether all wheels are running equally fast. If a difference is determined, e.g., if one wheel is slower, which means that the associated brake is braking too hard, step motor 76 is regulated by an adjustment impulse. This motor now rotates camshaft 38 in a very brief time period from the rest position through 45° into the end position, so that the passage through piston 33 is freed. If no difference is determined any longer, step motor 76 cuts off, camshaft 38 rotates immediately, preferably by means of a mechanical spring (not shown), into its rest position, and the passage through piston 33 is closed again. Camshaft 38 can, of course, also be rotated back by step motor 76.

This fact makes it possible to create an antiskid system in a most advantageous manner which has a speed-proportional antiskid frequency, because this frequency results from the number of radial bores in gear 4 and the speed. The precision of the determination of the difference between two wheels can be performed with a high resolution, e.g. in correspondence with the number of teeth of a delivery gear. At the start of the compensation of a difference the camshaft needs to be rotated only in the forward direction and at the end of the difference compensation it only needs to be rotated back. During this time an antiskid system frequency is superimposed corresponding to the passage of radial bores 22 to 25 of the gear over radial bores 34 to 37 of piston 33. It should be recalled that in accordance with the greater number of holes in cylinder 26, it is penetrable opposite gear 4.

In this manner even extremely slight deviations of the speeds of wheels among each other can be compensated at the earliest point in time by the antiskid system. At the same time a lower threshold speed before skidding is entered into the computer and control circuit at which the antiskid system is cut in even if no deviation had occured previously. This threshold speed can be determined by the software from high speeds to rather low speeds, so that after each switching of the antiskid system a speed comparison or frequency comparison between all brakes occurs. The brake which is now rotating too slowly in comparison with the others or which has reached the set braking speed before skidding is briefly switched to the antiskid system, which for its part produces a flowthrough through piston 33 in accordance with the antiskid frequency. In this manner an electrohydraulic antiskid system is obtained in which the antiskid frequency occurs hydraulically only via massless closing procedures and the rotation of camshaft 38 occurs electrically or hydraulically or in some other manner. This antiskid system is effective down to zero, that is, until the vehicle stops.

Since the switching frequency of the antiskid system is speed-proportional, it is advantageous to intermittently superimpose a higher switching frequency of camshaft 38 on the lower antiskid system frequency by software below a given speed. This makes the antiskid system operate precisely down to zero, that is, even precisely when, for example, a wheel is on ice during braking or the vehicle starts to skid at low speeds on ice. This superimposed switching frequency of camshaft 38 can still be at least in the range of a few 10 Hz, corresponding to the step motor 76 selected.

The device shown operates in the position shown in FIG. 5 in the same manner as a "soft" locking differential. As described above, the passage through piston 33 via radial bores 57 to 60 and slots 61, 62 of camshaft 38 is always open in the rest position. If a different speed of two wheels is determined during acceleration, the more rapidly running wheel is braked by the fact that camshaft 38 is rotated by 45° by step motor 76, which closes the passage through piston 33. If the speed of the wheels among themselves is again identical, step motor 76 slows down, camshaft 38 is immediately rotated back into its rest position and frees the flowthrough. The switching procedure by step motor 76 advantageously occurs in several stages corresponding to the value of the speed difference determined by the computer and control circuit. The device operated therewith like a controlled, automatically locking differential with non-rigid blocking with analog control of the delay force. If it is necessary to switch to braking, the hydraulic brake system of piston 33 and camshaft 38 is immediately available.

The step motor can also be used in an advantageous manner not only to cut the antiskid system in and out, but also to switch in stages according to the calculated requirements. The staged switching of step motor 76 can therefore also be employed with advantage for a further fine-tuning of the antiskid system.

Moreover, an analog or digital signal can be taken in an advantageous manner from the steering or, optionally, from the vehicle speed in addition. This signal is used to influence the curve behavior of the vehicle in order to adjust the wheels, either driving or driven, which deviate during curve travel from the admissible speed difference. To this end the two operating positions of the camshaft "brake with piston and antiskid system" and "accelerate as regulated selflocking differential with non-rigid blocking" are independent of one another and do not affect one another. In accordance with the construction the camshaft can be divided to this end into two independent camshafts, each of which carries a step motor. Or, the step motor has a central position with a single camshaft whose passages are placed in such a manner that when the braking operation of the locking differential is actuated, the closed position of the passages of the camshaft relative to "brake with piston and antiskid system" remain closed. Thus, when the camshaft for locking differential is actuated, the camshaft for brake with piston and antiskid system remains inactive, independently of the fact that the piston is inactive in any case. This can be achieved by a set geometric arrangement of the passages of the camshaft to the passages in the piston and in the cylinder.

By means of this method and the associated arrangement of the camshaft a braking force corresponding to the steering deflection and, if required, to the speed can be produced during curve travel on the inner wheel or wheels. In addition, the normal braking force can be superimposed on this braking force by the braking operation "brake with piston and antiskid system". This makes it possible to put a differentiated braking force on the driving and/or driven wheels according to requirements. This makes it possible to always be able to set the optimum static friction for each wheel.

Figure 7:
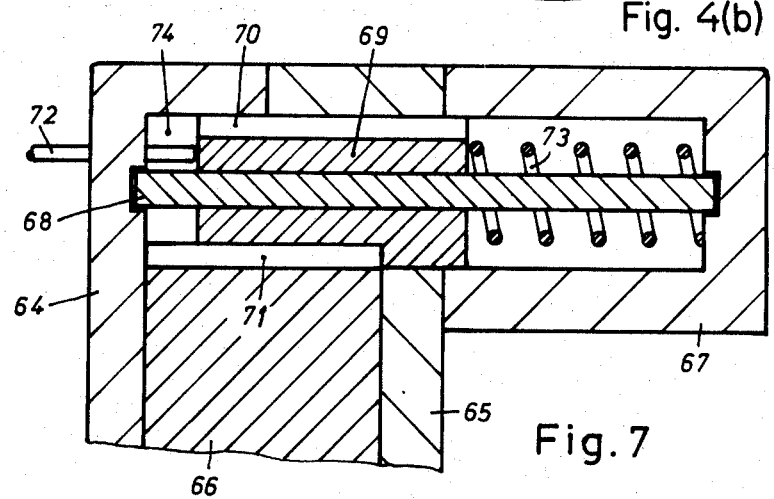
FIG. 7 is a cross-sectional view of another embodiment of a hydraulic brake with continuously controllable quantity delivered.

It can be useful for certain applications if the delivery flow can be regulated by the brake. FIG. 7 shows such a brake by way of example which consists of housing dishes 64,65 between which delivery gear 66 with gear rim 71 is located in a pressure-tight manner. The addendum line of gear 66 again runs close within housing dishes 64,65. Dosing gear 69, which can rotate about shaft 68 appropriately mounted in the housing, is located above gear 66. Moreover, dosing gear 69 can be shifted by push rod 72, which extends through housing dish 64 onto a front surface of dosing gear 69, against the force of pressure spring 73 out of the mesh of both gear rims 70, 71 into housing part 67 located at the side of housing dish 65. This creates a variable dosing chamber 74 above delivery gear 66 corresponding to the covering of gear rims 70,71 by dosing gear 69 and delivery gear 66. The delivery amount can be dosed with great advantage in a speed-dependent manner in this way.

The dosing gears must always run in the brake fluid in order that no air is delivered and pressure variations occur. For this reason liquid level 16 should be above dosing gears 6,7 and 69.

Figure 8:
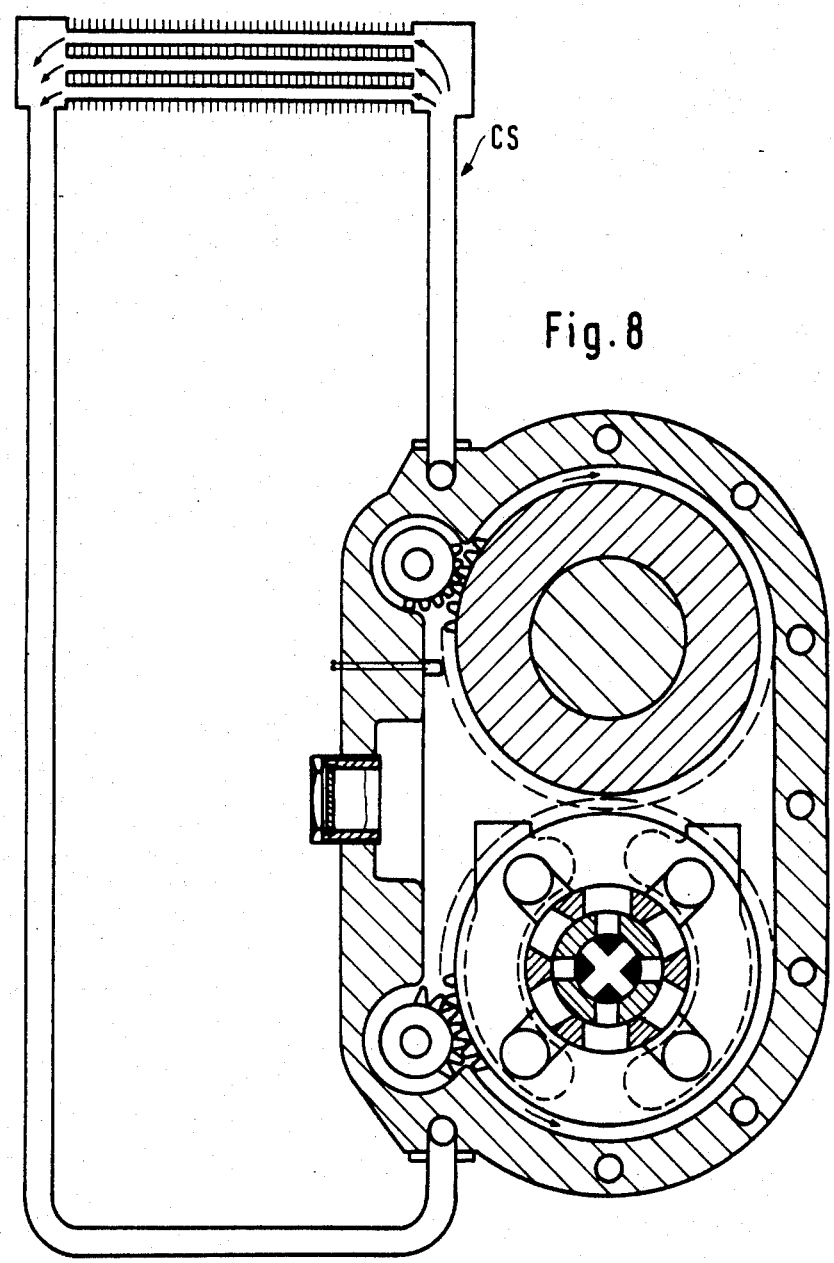
FIG. 8 shows the cooling system for the housing of the brake.

The cooling system CS for the housing 1, 2 is shown in FIG. 8.

I claim:

1. Hydraulic brake for vehicles, especially a wheel brake for motor vehicles having a wheel shaft, with a housing and a pressure line with a valve which are filled with a hydraulic brake fluid and with an actuating line for the valve, whereby the mechanical or kinetic energy of the vehicle during braking is converted into thermal energy in the brake fluid and transmitted via the housing to the atmosphere, comprising:
   (a) first and second gears which mesh with one another in a pressure-tight manner centrally located in the housing and forming a liquid-filled pressure chamber and a vacuum reservoir chamber according to the principle of a gear pump, whereby the first gear can be driven by the wheel shaft to be braked;
   (b) a return line for returning the brake fluid to the vacuum reservoir chamber through the axis of rotation of the second gear; and
   (c) a valve located in the return line, including an adjustable slide which can be actuated via the actuating line in order to regulate the amount of flow-through through the brake,
   wherein the return line includes conduits running through the second gear over the axis of rotation and a movable piston is centrally located in the second gear serving as a valve which selectively regulates opening of the conduits.

2. Hydraulic brake according to claim 1, wherein:
   (a) the conduits in the second gear include a number n of first cross holes which are peripherally located parallel to the second gear axis at equidistant intervals and which communicate with an equal number n of second holes which run radially to the second gear center;
   (b) the second gear includes a shaft which is a cylinder rigidly mounted in the housing and includes a central longitudinal bore and a number of at least n+1 third holes which radially penetrate the longitudinal bore and communicate with the second radial holes of the second gear;
   (c) the piston is located in the longitudinal bore of the cylinder and can be moved by a push rod against the force of a spring; and
   (d) the housing includes grooves on at least one inner side which extend at least into the uppermost and lowest emptying area of the first cross holes of the second gear, whereby one of the grooves connects at least one of the first cross holes to the vacuum reservoir chamber and another of the grooves connects at least the opposite first cross hole to the pressure chamber.

3. Hydraulic brake according to claim 2, wherein:
   (a) the piston includes a central longitudinal bore and a number n of equidistant, fourth radial holes which penetrate the longitudinal bore and communicate with fifth radial holes of the cylinder during braking;
   (b) the inner mouths of the fourth radial holes of the piston leave a blocking surface between adjacent fourth radial holes;
   (c) a camshaft extends into the longitudinal bore of the piston on which camshaft the piston can be moved longitudinally and includes a number n of sixth radial, penetrating holes in the vicinity of the fifth radial holes of the cylinder, which sixth radial holes communicate with the fourth radial holes of the piston and whose diameter is smaller than the diameter of the blocking surfaces; and
   (d) the camshaft is mounted for rotation through an angle from the closed into the through position.

4. Hydraulic brake according to claim 3, wherein the fifth radial holes in the cylinder and the sixth radial holes in the camshaft are slots.

5. Hydraulic brake according to claim 3, wherein:
   (a) the piston includes in two-cross-sectional planes superimposed, equidistant, the fourth radial holes and seventh radial holes which penetrate the longitudinal bore, whereby in rest position the seventh radial holes, and in braking position the fourth radial holes communicate with the radial holes of the cylinder;
   (b) the camshaft includes in two cross-sectional planes a number n of the sixth and an eighth radial, equidistant and penetrating holes, whereby the sixth radial holes communicate with the fourth radial holes of the piston, the eighth radial holes communicate with the seventh radial holes of the piston and the diameter of the seventh radial holes is smaller than the diameter of the blocking surfaces, whereby the sixth radial holes of the one cross-sectional plane are rotated in relation to the eighth radial holes of the other cross-sectional plane by an angle corresponding to the number of holes;
   (c) the camshaft is mounted for rotation through an angle or through several steps from the closed position into the through position; and
   (d) the camshaft can be entrained by the piston during a translatory movement.

6. Hydraulic brake according to claim 3 or 5, further comprising a dosing gear sealed in the housing above at least one of the first or second gear and meshing therewith, whereby the gear rim of this dosing gear includes a peripheral circular recess, in particular a turned groove.

7. Hydraulic brake according to claim 6, wherein the dosing gear is mounted so that it can be moved in an axial direction against the force of a spring out of mesh with the first gear.

8. Hydraulic brake according to claim 7, wherein the dosing gear rim includes a lesser tooth height than the gear rim of the first gear.

9. Hydraulic brake according to claim 3 or 6, wherein the camshaft extends from the outside through the cylinder into the piston, and wherein a step motor is located on the outer end of the camshaft.

10. Hydraulic brake according to claim 1, wherein the housing is water cooled and is positioned in a water cooling circuit.

11. A method for preventing the skidding of the wheels of a vehicle during braking or the spinning of the wheels during acceleration, comprising the following steps:
- (a) forming a hydraulic brake for vehicles, especially a wheel brake for motor vehicles, including a wheel shaft, with a housing and a pressure line with a valve which are filled with a hydraulic brake fluid and with an actuating line for the valve, whereby the mechanical or kinetic energy of the vehicle during braking is converted into thermal energy in the brake fluid and transmitted via the housing to the atmosphere, and further including
  - (1) forming first and second gears which mesh with one another in a pressure-tight manner centrally located in the housing and forming a liquid-filled pressure chamber and a vacuum reservoir chamber according to the principle of a gear pump, whereby the first gear can be driven by the wheel shaft to be braked,
  - (2) forming a return line for returning the brake fluid to the vacuum reservoir chamber through the axis of rotation of the second gear,
  - (3) forming a valve located in the return line, including an adjustable slide which can be actuated via the actuating line in order to regulate the amount of flowthrough through the brake, wherein the return line includes conduits running through the second gear over the axis of rotation and a movable piston is centrally located in the second gear serving as a valve which selectively regulates opening of the conduits,
  - (4) forming the conduits in the second gear to include a number n of first cross holes which are peripherally located parallel to the second gear axis at equidistant intervals and which communicate with an equal number n of second holes which run radially to the second gear center,
  - (5) forming the second gear to include a shaft which is a cylinder rigidly mounted in the housing and includes a central longitudinal bore and a number of at least n+1 third holes which radially penetrate the longitudinal bore and communicate with the second radial holes of the second gear,
  - (6) locating the piston in the longitudinal bore of the cylinder such that the piston can be moved by a push rod against the force of a spring,
  - (7) forming the housing to include grooves on at least one inner side which extend at least into the uppermost and lowest emptying area of the first cross holes of the second gear, whereby one of the grooves connects at least one of the first cross holes to the vacuum reservoir chamber and another of the grooves connects at least the opposite first cross hole to the pressure chamber,
  - (8) forming the piston to include a central longitudinal bore and a number n of equidistant, fourth radial holes which penetrate the longitudinal bore and communicate with fifth radial holes of the cylinder during braking,
  - (9) forming the inner mouths of the fourth radial holes of the piston such that they leave a blocking surface between adjacent fourth radial holes,
  - (10) forming a camshaft such that it extends into the longitudinal bore of the piston on which camshaft the piston can be moved longitudinally and includes a number n of sixth radial, penetrating holes in the vicinity of the fifth radial holes of the cylinder, which sixth radial holes communicate with the fourth radial holes of the piston and whose diameter is smaller than the diameter of the blocking surfaces, and
  - (11) mounting the camshaft for rotation through an angle from the closed into the through position;
- (b) deriving an electric impulse frequency, preferably one impulse per tooth, from the rotating gears;
- (c) storing the frequencies of the gears in an electronic computer and control circuit;
- (d) comparing the frequencies with each other;
- (e) initiating braking via the piston with passage closed by the camshaft;
- (f) briefly rotating the camshaft of the more slowly rotating gear in the through direction when the frequencies of the wheels differ from each other;
- (g) passing liquid through the piston until the frequency of the slower gear is equal to the frequencies of the other gears;
- (h) switching the camshaft into the blocking position;
- (i) comparing the gear frequency reached after braking with the stored vehicle speed and, if a difference is detected, initiating a new cycle in accordance with the steps (f) and (g) and initiating acceleration with the camshaft in the through position and the piston in the rest position and, if the frequency of one gear differs from the others, briefly rotating the camshaft of the gear which is rotating too rapidly until the frequency of the gear is made equal to the other gears and again rotating the camshaft in the through direction.

12. The method according to claim 11, further comprising the step of: superimposing an intermittent switching frequency on the derived frequency at a predetermined speed.

13. A method of improving the road position of a vehicle during travel along a curve, comprising the following steps:
- (a) forming a hydraulic brake for vehicles, especially a wheel brake for motor vehicles, including a wheel shaft, with a housing and a pressure line with a valve which are filled with a hydraulic brake fluid and with an actuating line for the valve, whereby the mechanical or kinetic energy of the vehicle during braking is converted into thermal energy in the brake fluid and transmitted via the housing to the atmosphere, and further including (1) forming first and second gears which mesh with one another in a pressure-tight manner centrally located in the housing and forming a liquid-filled pressure chamber and a vacuum reservoir chamber according to the principle of a gear pump, whereby the first gear can be driven by the wheel shaft to be braked, (2) forming a return line for returning the brake fluid to the vacuum reservoir chamber through the axis of rotation of the second gear, and (3) forming a valve located in the return line, including an adjustable slide which can be actuated via the actuating line in order to regulate the amount of flowthrough through the brake, wherein the return line includes conduits running through the second gear over the axis of rotation and a movable piston is centrally located in the second gear serving as a valve which selectively regulates opening of the conduits, (4) forming the conduits in the second gear to include a number n of first cross holes which are peripherally located parallel to the second gear axis at equidistant intervals and which communicate with an equal number n of second holes which run radially to the second gear center, (5) forming the second gear to include a shaft which is a cylinder rigidly mounted in the housing and includes a central longitudinal bore and a number of at least $n+1$ third holes which radially penetrate the longitudinal bore and communicate with the second radial holes of the second gear, (6) locating the piston in the longitudinal bore of the cylinder such that the piston can be moved by a push rod against the force of a spring, (7) forming the housing to include grooves on at least one inner side which extend at least into the uppermost and lowest emptying area of the first cross holes of the second gear, whereby one of the grooves connects at least one of the first cross holes to the vacuum reservoir chamber and another of the grooves connects at least the opposite first cross hole to the pressure chamber, (8) forming the piston to include a central longitudinal bore and a number n of equidistant, fourth radial holes which penetrate the longitudinal bore and communicate with fifth radial holes of the cylinder during braking, (9) forming the inner mouths of the fourth radial holes of the piston such that they leave a blocking surface between adjacent fourth radial holes,

(10) forming a camshaft such that it extends into the longitudinal bore of the piston on which camshaft the piston can be moved longitudinally and includes a number n of sixth radial, penetrating holes in the vicinity of the fifth radial holes of the cylinder, which sixth radial holes communicate with the fourth radial holes of the piston and whose diameter is smaller than the diameter of the blocking surfaces, and

(11) mounting the camshaft for rotation through an angle from the closed into the through position;

(b) deriving an electric impulse frequency, preferably one impulse per tooth, from the rotating gears;

(c) storing the frequencies of all gears in an electronic computer and control circuit;

(d) comparing the frequencies with each other;

(e) generating an electric signal corresponding to the direction and the intensity of the steering deflection;

(f) feeding the electrical signal to the computer and control circuit, wherein the positions of the camshaft for the two functions "brake with piston and antiskid system" or "accelerate as controlled selflocking differential with non-rigid blocking" are independent of one another and do not affect one another; and (g) proportionately rotating the camshaft of the locking differential of the brake of the driving wheel or wheels and/or of the driven wheel or wheels in the locking direction corresponding to the steering deflection and, optionally, in addition with the vehicle speed, wherein, if additional braking is initiated, if occurs via the piston according to the above steps.

14. The method according to claim 13, further comprising the step of:
providing the camshaft with a separate step motor for each of the two functions "brake with piston and antiskid system" and "accelerate as controlled selflocking differential with non-rigid blocking".

15. The method according to claim 14, further comprising the step of:
forming the camshaft with independent passages for both functions, wherein the step motor has a middle position at which the piston is inactive and the passage for the locking differential is open and the camshaft can be actuated so as to rotate to the left or to the right.

* * * * *